3,159,586
STABILIZED SOLUTIONS OF METAL-SPECIFIC INDICATOR DYES
Reginald Wildenhayn, Hannover-Kleefeld, Germany, assignor to Gebruder Heyl Chemische Fabrik K.G., Hildesheim, Germany
No Drawing. Filed May 24, 1961, Ser. No. 112,214
Claims priority, application Germany, May 28, 1960, H 39,553
3 Claims. (Cl. 252—408)

Water analysis and especially the determination of water hardness has been completely revolutionized by the introduction of complexometric analysis, using, at suitable pH-levels, specific chelating agents for calcium and magnesium-ions in the presence of metal-specific indicators as e.g. o,o'-dihydroxy-diaryl-azo dyes, the most important of which is 1-(1-hydroxy-2-naphthylazo-6-nitro-2-naphthol-4-sulfonic acid or Eriochrome Black-T. A drawback of this time-saving method is the fact that the class of azo dyes, used as indicators, has little stability in solution, and so, in contrast to other indicator dyes normally used in the chemical laboratory, had to be used in solid form or a fresh solution of it had to be prepared every day. This negative property of Erio-T has largely been responsible for the fact that complexometry could be used only in the laboratory and could not supersede the antiquated and rather cumbersome methods of practical on the spot tests for water hardness in a large number of plants in all kinds of industry. For the same reason it was difficult to automate waterhardness tests for steam generators etc.

Considering the desirability of a stable solution of Erio-T-type indicators, numerous attempts have been made in the past to attain this goal, all of which have met with little success. Neither the exclusion of light nor the substitution of less polar solvents as e.g. alcohol or triethanolamine for water, could stabilize the dye molecule to any practically useful degree, nor could the change of molecular structure of the dye lead to a useful and really stable solution.

The first object of this invention is to find a method for the indefinite stabilization. The second object is to modify the stabilized solution in such a way that no further reagents such as a buffer or a magnesium salt need be added to the sample.

It was found that the slight stabilizing effect which a number of aminoalcohols, e.g. triethanolamine, diisopropanolamine, trishydroxymethylaminomethane, etc. exert on Erio-T, is immediately reversed by the addition of solvents like water, simple alcohols, ketones etc. Polyalcohols, however, and especially polyglycols, surprisingy exert a strongly stabilizing effect on Erio-T-type dyes, and solutions of said dyes containing 30% or more of these polyglycols can be kept indefinitely even in direct sunlight and exposed to air. These solutions may contain besides the dye and a polyglycol, the molecular weight of which is unimportant, water, alcohols, aminoalcohols, salts of chelating agents like EDTA and other indifferent dyes, the stability is no way affected thereby.

A typical example for a stabilized solution of Erio-T comprises the following constituents (1)
| | G. |
|---|---|
| Erio-T | 4.8 |
| Methyl orange | 1.4 |
| Diisopropanolamine | 100.0 |
| Trishydroxymethylaminomethane | 30.0 |
| Di - potassum - magnesium - ethylenediamine - tetraacetic acid | 6.0 |
| Distilled water | 140.0 |
| Polyethyleneglycol 400 | 723.0 |

In this example methyl orange does not participate in the reaction; it is added only as an indifferent yellow dye to effect a better visible color change from red to green rather than from violet to blue. Diisopropanolamine and trishydroxymethylaminomethane are added as alkaline materials to impart to the water sample to be tested with the indicator the correct pH-value of 9–10; di-potassum-magnesium-ethylenediamine tetraacetic acid imparts a sharp colour change at the end-point of titrations with chelating agents. This solution can be used as a test for completely soft water, e.g. one drop added to a 5 ml. water sample shows a green color if the sample is free of residual hardness, brown-violet up to 1 p.p.m. $CaCO_3$ and red above 1 p.p.m., or it can be used as an indicator in connection with an alkaline standard solution of a chelating agent of the EDTA [1] type to determine the degree of hardness, and finally fixed amounts of chelating agents can be added to the stabilized indicator solution to effect a simplified test for residual hardness in softened water. This latter possibility is especially useful for the employment of the indicator in connection with automatic tests for continuous surveillance of boiler feed-water.

(2)
| | |
|---|---|
| Erio-T | mg__ 20 |
| Polyethylene glycol 400 | g__ 50 |

This solution can be used only in connection with a buffer solution.

(3)
| | |
|---|---|
| Eriochrome Blue Black | mg__ 40 |
| Di - potassium - magnesium - ethylene diamine tetraacetic acid | g__ 1 |
| Trishydroxymethyl aminoethane | g__ 4 |
| Distilled water | g__ 30 |
| Polypropyleneglycol 300 | g__ 65 |

(4)
| | |
|---|---|
| Diisopropanolamine | g__ 130 |
| Di-potassium magnesium-ethylene diamine tetraacetic acid | g__ 5 |
| Distilled water | g__ 140 |

| | G |
|---|---|
| Erio-T | 4.8 |
| Methyl orange | 1.4 |
| Di-sodium ethylene diamine tetraacetic acid | 2.8 |
| Polyethylene glycol 200 | 723 |

With this solution a color change from green to red will occur at 5 p.p.m. when one drop is added to a 5 ml. water sample or in an automatic tester when 0.1 ml.

[1] Ethylene diamine tetraacetic acid.

of the indicator is metered to a 20 ml. measuring chamber.

Examples of chelating agents of the EDTA-type are: Ethylene diamine tetraacetic acid and/or its alkali metal salts; cyclohexylene diamine tetraacetic acid and/or its alkali metal salts.

What I claim is:

1. An aqueous indicator solution of a metal specific indicator dye of the o,o'-dihydroxydiarylazo type containing as a stabilizing agent a polyhydric alcohol selected from the group consisting of polyethylene glycols and polypropylene glycols, having a molecular weight up to 1000, in an amount of at least 30 percent by weight of the solution.

2. A stabilized solution according to claim 1 containing fixed amounts of a chelating agent selected from the group consisting of di-potassium magnesium ethylene diamine tetraacetate and disodium ethylene diamine tetraacetate so that the solution can be used simultaneously as indicator and titrant.

3. A stabilized solution according to claim 1, containing a water soluble aminoalcohol in such amounts that the pH-value of a neutral water sample treated with said stabilized indicator solution is adjusted to pH 9–10.

References Cited in the file of this patent

Diskant: "Stable Indicator Solution for Complexometric Determination of Total Hardness in Water," Analytical Chemistry, volume 24, No. 11, November 1952, pp. 1856–1857.

Schwarzenbach: "Complexometric Titrations," Interscience Publishers, Inc., N.Y., 1955, translated and revised 1957, pp. 35, 58 and 65.